US006980386B2

(12) United States Patent
Wach et al.

(10) Patent No.: US 6,980,386 B2
(45) Date of Patent: Dec. 27, 2005

(54) APPARATUS AND METHOD FOR WRITING DATA TO AN INFORMATION STORAGE DISC

(75) Inventors: Joseph L Wach, Longmont, CO (US); Khalil B Dizaji, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 66 days.

(21) Appl. No.: 10/453,955

(22) Filed: Jun. 4, 2003

(65) Prior Publication Data

US 2004/0246614 A1 Dec. 9, 2004

(51) Int. Cl.[7] ............................................ G11B 15/12
(52) U.S. Cl. ...................... 360/63; 360/48; 360/78.08; 711/4; 711/112
(58) Field of Search ......................... 360/61, 63, 78.08, 360/48, 46; 711/4, 112

(56) References Cited

U.S. PATENT DOCUMENTS 5,872,673 A 2/1999 Purkett
6,014,837 A 1/2000 Morgan
6,105,104 A 8/2000 Edward
6,118,609 A 9/2000 Gong
6,388,413 B1 5/2002 Ng
6,693,766 B1 * 2/2004 Wilkes et al. ............ 360/78.08
2001/0033450 A1 10/2001 Bryant

* cited by examiner

*Primary Examiner*—David Hudspeth
*Assistant Examiner*—Dan I Davidson
(74) *Attorney, Agent, or Firm*—Kirk A. Cesari

(57) ABSTRACT

A disc drive has transducers supported by an actuator to fly proximate data tracks on surfaces of rotating information storage discs. Each of the discs is partitioned into concentric regions. A control system arranges the deposition of data in write operations to the tracks on the disc surfaces, as data is written to the discs, such that the data is sequentially organized both on the tracks and within each of the regions. The control system writes data from a track adjacent a first region boundary in a first direction to a second region boundary until all tracks in a region are full. The control system executes a head switch between adjacent surfaces of the discs. The write sequence is repeated in each adjacent region until all regions are full. The resulting trapezoidal serpentine pattern of actuator movement and head switches is repeated until all of the write operations are complete.

7 Claims, 4 Drawing Sheets

APPARATUS AND METHOD FOR WRITING DATA TO AN INFORMATION STORAGE DISC

FIELD OF THE INVENTION

This application relates generally to data storage systems, and more particularly to an apparatus and method for writing data to an information storage disc in a trapezoidal serpentine pattern.

BACKGROUND OF THE INVENTION

Disc drives are data storage devices that store digital data in optical/magnetic form on a rotating storage medium. Modern magnetic disc drives comprise one or more information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads in an arc across the surface of the discs. Each of the concentric tracks on each surface is generally divided into a plurality of separately addressable data sectors. The recording transducer, e.g. a head carrying a magnetoresistive read element and an inductive write element, is often referred to as a read/write head. The head is used to transfer data between a desired track and an external environment. During a write operation, data is written onto the disc track and during a read operation the head senses the data previously written on the disc track and transfers the information to a host computing system. The overall capacity of the disc drive to store information is dependent upon the disc drive recording density.

The transducers (heads) are mounted on gimbals and supported via flexures at the distal ends of a plurality of actuator arms that project radially outward from the actuator body. The actuator body pivots about a shaft mounted to the disc drive base plate at a position closely adjacent the outer edges of the discs. The pivot shaft is parallel with the axis of rotation of the spindle motor and the discs, so that the transducers move in planes parallel with the surfaces of the discs.

Such rotary actuators typically employ a voice coil motor to position the transducers with respect to the disc surfaces. The actuator voice coil motor includes a voice coil extending or projecting from the actuator body in a direction opposite the actuator arms and immersed in the magnetic field formed by one or two bipolar permanent magnets. When controlled direct current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the transducers move across the disc surfaces. The actuator thus allows the transducers to move back and forth in an arcuate fashion between an inner diameter and an outer diameter of the disc stack.

The transducers sequentially write data to tracks on the disc surface. When the transducer that is executing the write operation reaches the end of a track, the transducer ceases execution of the write operation. The actuator positions the transducer over an adjacent track on the same disc surface, or a "head switch" is performed, i.e., a different transducer is selected to receive the incoming write signals and the write operation is executed on a different disc surface.

In one head switch pattern, the transducers sequentially execute write operations on aligned tracks of corresponding disc surfaces. A head switch is performed each time a track is full. The actuator positions the transducers in alignment with the adjacent tracks after a group of aligned tracks are full. The head switches continue in sequence as the aligned tracks become full. The actuator continues positioning the transducers in alignment with adjacent tracks. The write operations are sequentially executed in accordance with the head switches until the write operation is complete.

Track pitch on a disc has become progressively smaller as disc drive capacities increase. The minute track pitch hinders the actuator from precisely aligning the transducer with the subsequent track from one disc surface to the next. To overcome this problem, each head switch is followed by an actuator seek operation to align the transducer with the appropriate track. An actuator seek operation executed after a head switch substantially decreases the efficiency of disc drive performance.

An existing method for executing a write operation implements a "serpentine" format of actuator movement and head switches. Each disc surface is partitioned into a number of concentric regions such that each region includes several tracks. The actuator positions the transducer above a track on an upper disc surface. The transducer executes a write operation until the track is full. The write operation ceases as the actuator moves toward an inner boundary of the region to position the transducer in alignment with an adjacent track. The transducer continues executing the write operation on the adjacent track until the track is full. The actuator moves toward the inner boundary of the region to position the transducer in alignment with subsequent adjacent tracks after each track is filled.

A head switch is performed when the track on the upper disc surface adjacent to the inner boundary of the region is full. The transducer executes a write operation on a track on a lower disc surface adjacent to the inner boundary of the region until the track is full. The write operation ceases and the actuator moves toward an outer boundary of the region to position the transducer in alignment with an adjacent track. The transducer executes the write operation on the aligned track until the track is full. The actuator moves toward the outer boundary of the region to position the transducer in alignment with subsequent adjacent tracks after each aligned track is full. A head switch is performed when the track adjacent to the outer boundary of the region is full. The "serpentine" format is repeated on the remaining disc surfaces until the write operation is complete.

The execution of sequential write operations within a region before performing a head switch minimizes the number of head switches and actuator seek operations during a write operation. After a head switch is performed, the transducer is misaligned with the sequential track by an average of 10 tracks due to the fine track pitch on the disc surface. In a disc drive having an even number of disc surfaces, a seek operation is required after one complete serpentine iteration to determine the start location of the next iteration. Thus, different formats are required for odd and even number of disc surfaces. Furthermore, the serpentine format described requires the ability to increment logically in both inner and outer directions on a disc surface. Against this backdrop the present invention has been developed.

SUMMARY OF THE INVENTION

A disc drive that incorporates an embodiment of the present invention has transducers supported by an actuator to fly proximate data tracks on surfaces of rotating information storage discs. Each of the information storage discs is partitioned into concentric regions. A control system arranges the deposition of data in write operations to the tracks on the disc surfaces, as data is written to the discs, preferably such that the data is sequentially organized both on the tracks and within each of the regions. For an "empty" disc, the actuator first positions a transducer in alignment with and follows a track adjacent a first boundary of a first region on a disc surface. The transducer executes a write operation on the track until either the write operation is complete or the track is full. When the track is full, the actuator seeks an adjacent track in one direction toward a second boundary of the region. The transducer then follows this adjacent track and executes a write operation on the aligned track until this adjacent track is full. The actuator then seeks in the same direction toward the second boundary of the region to the next adjacent track. The actuator positions the transducer in alignment with this adjacent track and executes a write operation as before. This process repeats on each subsequent track in the region until a track adjacent to the second boundary of the region is full.

A head switch is performed when the track adjacent to the second boundary of the region is full. Instead of moving the transducer into another region on the disc surface, the actuator moves in a second (reverse) direction to position another transducer on an adjacent disc surface over a track adjacent the first boundary of the first region on the adjacent disc surface. The control system then executes a write operation via the another transducer on this track until this track is full. The actuator then seeks in the first direction to position the another transducer in alignment with an adjacent track. The transducer follows this adjacent track while write operations on this track are performed until the track is full. The actuator then continues to seek, follow and write to each adjacent track in the first direction toward the second boundary of the region until the last track adjacent the second boundary is full.

A head switch is again performed to a next transducer when the track adjacent to the second boundary of the region is full. The actuator again moves in a second (reverse) direction toward the first boundary of the region to position the next transducer in alignment with a track adjacent to the first boundary of the region on the next adjacent disc surface. The control system again sequentially executes write operations in the first direction on each track in the region. When the region on this adjacent surface is full, another head switch takes place and the process repeats until each track in the region is full.

When the region is full on each disc surface, i.e., no further head switches are available, the actuator moves the transducer on this last disc surface into an adjacent, different region. The actuator writes each track sequentially and seeks to each adjacent track in the same direction until the track adjacent a second boundary of the adjacent different region is full. A head switch is then executed to the transducer for the next adjacent disc surface and the actuator is moved in a reverse direction to position the transducer in alignment with a track adjacent the first boundary of the adjacent different region. This track is written until full, and then the actuator moves in the first direction to the next track and the write continues. This process of writing to the disc results in a trapezoidal serpentine pattern of movement. The trapezoidal serpentine pattern of actuator movement and head switches is repeated until all of the write operations are complete. This pattern of writing to the discs optimizes the data write operational time and minimizes the amount of time necessary to retrieve data.

These and various other features as well as advantages which characterize the present invention will be apparent from a reading of the following detailed description and a review of the associated drawings.

DETAILED DESCRIPTION

Figure 1:
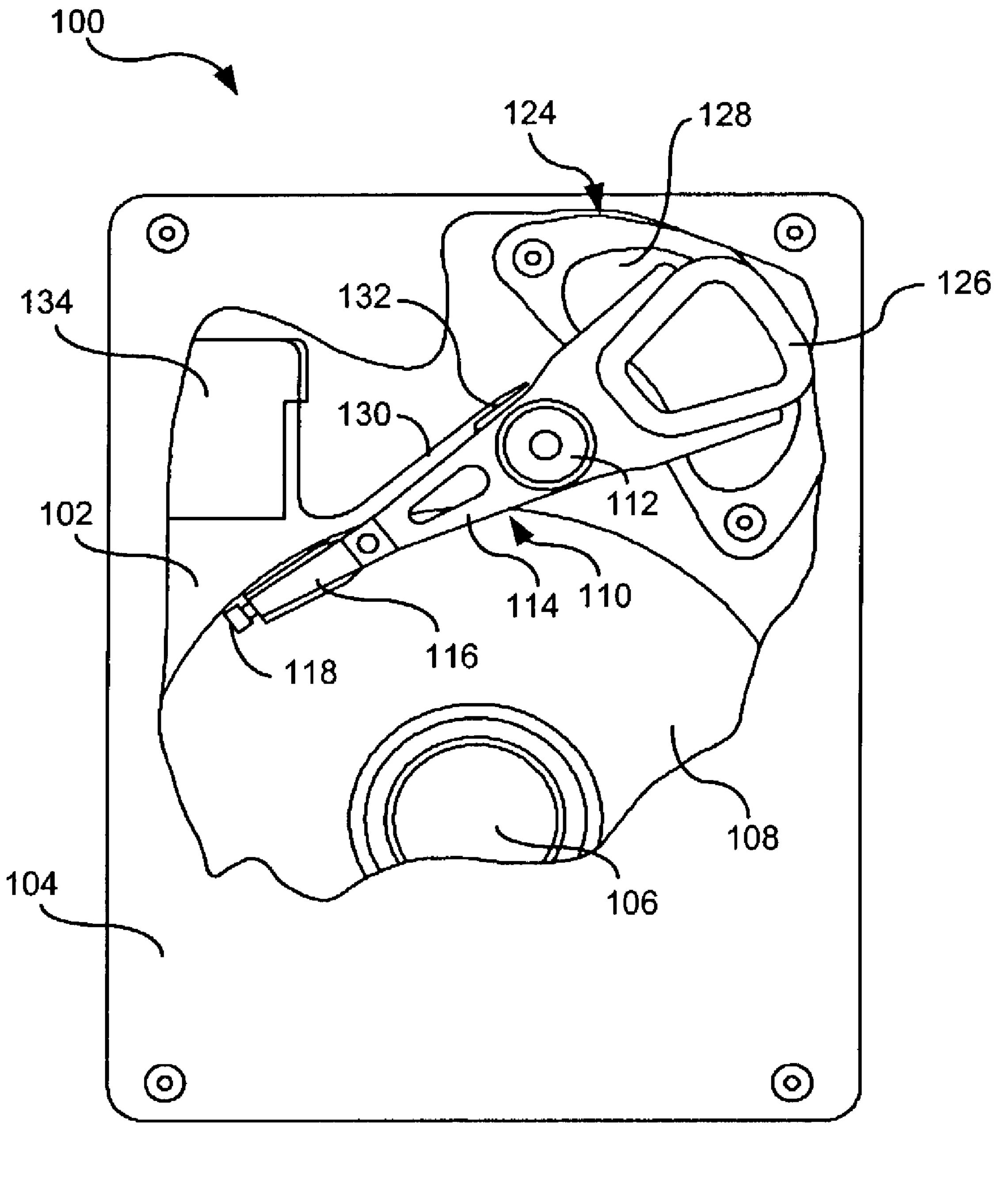
FIG. 1 is a plan view of a disc drive incorporating a preferred embodiment of the present invention showing the primary internal components.

A disc drive 100 is illustrated in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spin motor 106, which rotates one or more discs 108 at a constant high speed. Information is written to and read from tracks on the discs 108 through the use of an actuator 110, which rotates during a seek operation about a bearing shaft assembly 112 positioned adjacent the discs 108. The actuator 110 includes a plurality of actuator arms 114 which extend towards the discs 108, with one or more flexures 116 extending from each of the actuator arms 114. Mounted at the distal end of each of the flexures 116 is a transducer 118 which is carried by a fluid bearing slider (not shown) enabling the transducer 118 to fly in close proximity above the corresponding surface of the associated disc 108.

During a seek operation, the track position of the transducer 118 is controlled through the use of a voice coil motor (VCM) 124, which typically includes a coil 126 attached to the actuator 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator 110 pivots about the bearing shaft assembly 112, and the transducers 118 are caused to move across the surfaces of the discs 108.

A flex assembly 130 provides the requisite electrical connection paths for the actuator 110 while allowing pivotal movement of the actuator 110 during operation. The flex assembly 130 includes a printed circuit board 132 to which head wires (not shown) are connected; the head wires being routed along the actuator arms 114 and the flexures 116 to the transducers 118. The printed circuit board 132 typically includes circuitry for controlling the write currents applied to the transducers 118 during a write operation and a preamplifier for amplifying read signals generated by the transducers 118 during a read operation. The flex assembly 130 terminates at a flex bracket 134 for communication through the base 102 to a disc drive printed circuit board (not shown) mounted to the bottom side of the disc drive 100.

Figure 2:
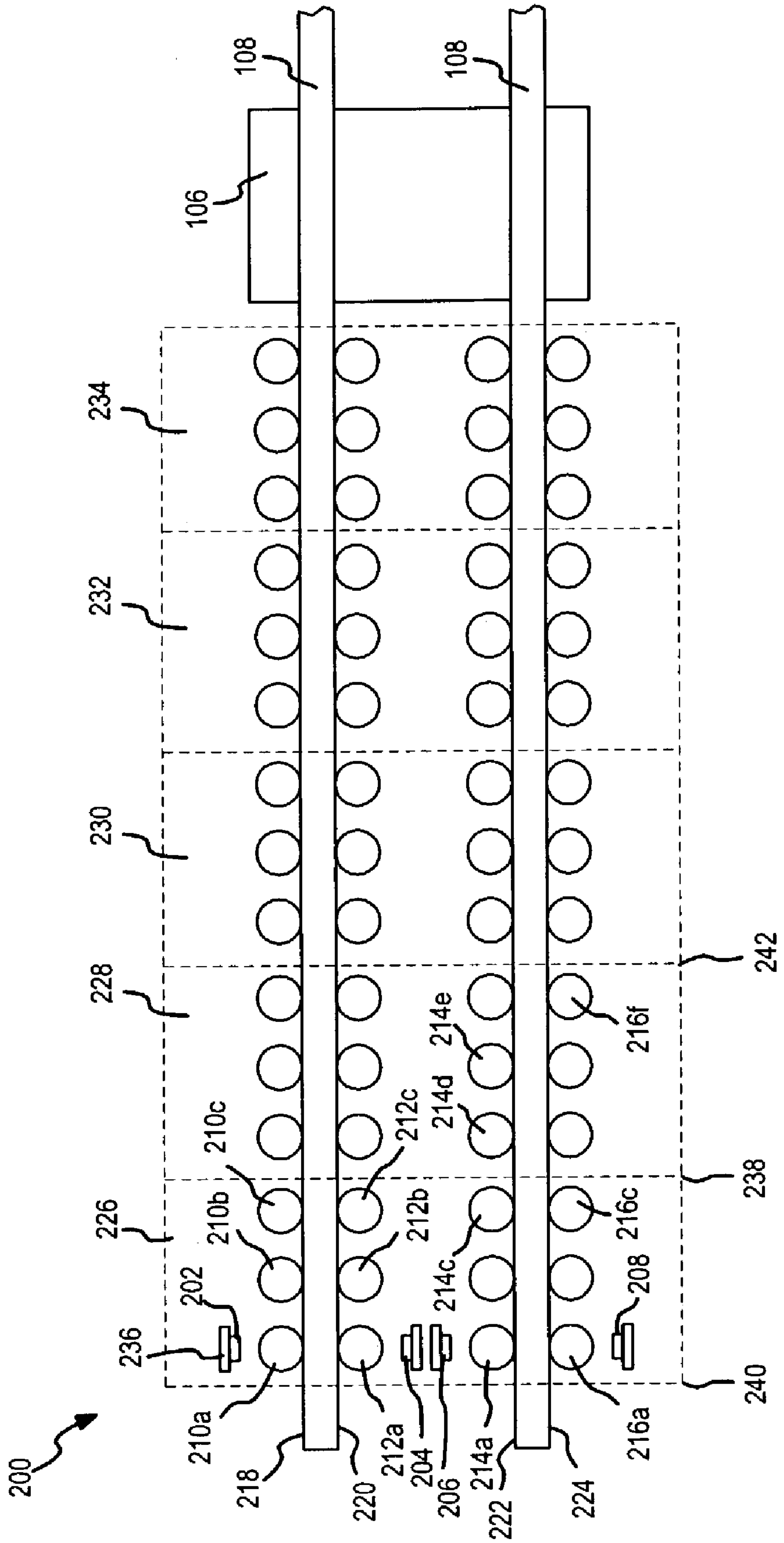
FIG. 2 is a cross sectional view of a portion of a disc drive showing transducers positioned in alignment with tracks on corresponding disc surfaces.

A cross sectional view of a portion of a disc drive 200 showing transducers 202, 204, 206, 208 supported by an actuator 236 to fly proximate data tracks 210*a*, 212*a*, 214*a*, 216*a* on corresponding disc surfaces 218, 220, 222, 224 is shown in FIG. 2. Each disc surface 218, 220, 222, 224 is partitioned into multiple concentric regions 226, 228, 230, 232, 234. A control system (not shown) arranges the deposition of data in write operations to the tracks 210*a*, 212*a*, 214*a*, 216*a* preferably such that the data is sequentially organized both on the tracks 210*a*, 212*a*, 214*a*, 216*a* and within each of the regions 226, 228, 230, 232, 234. For an "empty" disc, the actuator 236 first positions a transducer 202 in alignment with and follows a track 210*a* adjacent a first boundary 240 of a region 226 on a disc surface 218. The transducer 202 executes a write operation on the track 210*a* until either the write operation is complete or the track 210*a* is full.

When the track 210*a* is full, the actuator 236 seeks an adjacent track 210*b* in one direction toward a second boundary 238 of the region 226. The transducer 202 follows the adjacent track 210*b* and executes a write operation until the track 210*b* is full. The actuator 236 then seeks in the same direction toward the second boundary 238 of the region 226 to the next adjacent track 210*c*.

The actuator 236 positions the transducer 202 in alignment with the adjacent track 210*c* and executes a write operation as before. This process repeats on each subsequent track in the region 226 until a track adjacent to the second boundary 238 of the region 226 is full.

A head switch is performed when the track adjacent to the second boundary 238 of the region 226 is filled. Instead of moving the transducer 202 into another region on the disc surface 218, the actuator 236 moves in a second (reverse) direction to position another transducer 204 on an adjacent disc surface 220 over a track 212*a* adjacent the first boundary 240 of the first region 226 on the adjacent disc surface 220. The control system then executes a write operation via the another transducer 204 until the track 212*a* is full. The actuator 236 then seeks in the first direction to position the another transducer 204 in alignment with an adjacent track 212*b*. The transducer 204 follows the track 212*b* while write operations are performed on the track 212*b* until the track 212*b* is full. The actuator 236 then continues to seek, follow and write to each adjacent track in the first direction toward the second boundary 238 of the region 226 until the last track 212*c* adjacent the second boundary 238 is full.

A head switch is again performed to a next transducer 206 when the track 212*c* adjacent to the second boundary 238 of the region 226 is full. The actuator 236 again moves in a second (reverse) direction toward the first boundary 240 of the region 226 to position the next transducer 206 in alignment with a track 214*a* adjacent to the first boundary 240 of the region 226 on the next adjacent disc surface 222. The control system again sequentially executes write operations in the first direction on each track in the region 226. When the region 226 on the adjacent surface 222 is full, another head switch takes place and the process repeats until each track in the region 226 is full.

When the region 226 is full on each disc surface 218, 220, 222, 224, i.e., no further head switches are available, the actuator 236 moves the transducer 208 on the last disc surface 224 into an adjacent, different region 228. The actuator 236 writes each track sequentially and seeks to each adjacent track in the same direction until the track 216*f* adjacent a second boundary 242 of the adjacent, different region 228 is full. A head switch is then executed to the transducer 206 for the next adjacent disc surface 222 and the actuator 236 is moved in a reverse direction to position the transducer 206 in alignment with a track 214*d* adjacent the first boundary 238 of the adjacent, different region 228. The track 214*d* is written until full, and then the actuator 236 moves in the first direction to the next track 214*e* and the write continues.

This process of writing to the disc results in a trapezoidal serpentine pattern of movement. The trapezoidal serpentine pattern of actuator movement and head switches is repeated until all of the write operations are complete. This pattern of writing to the discs optimizes the data write operational time and minimizes the amount of time necessary to retrieve data.

Figure 3:
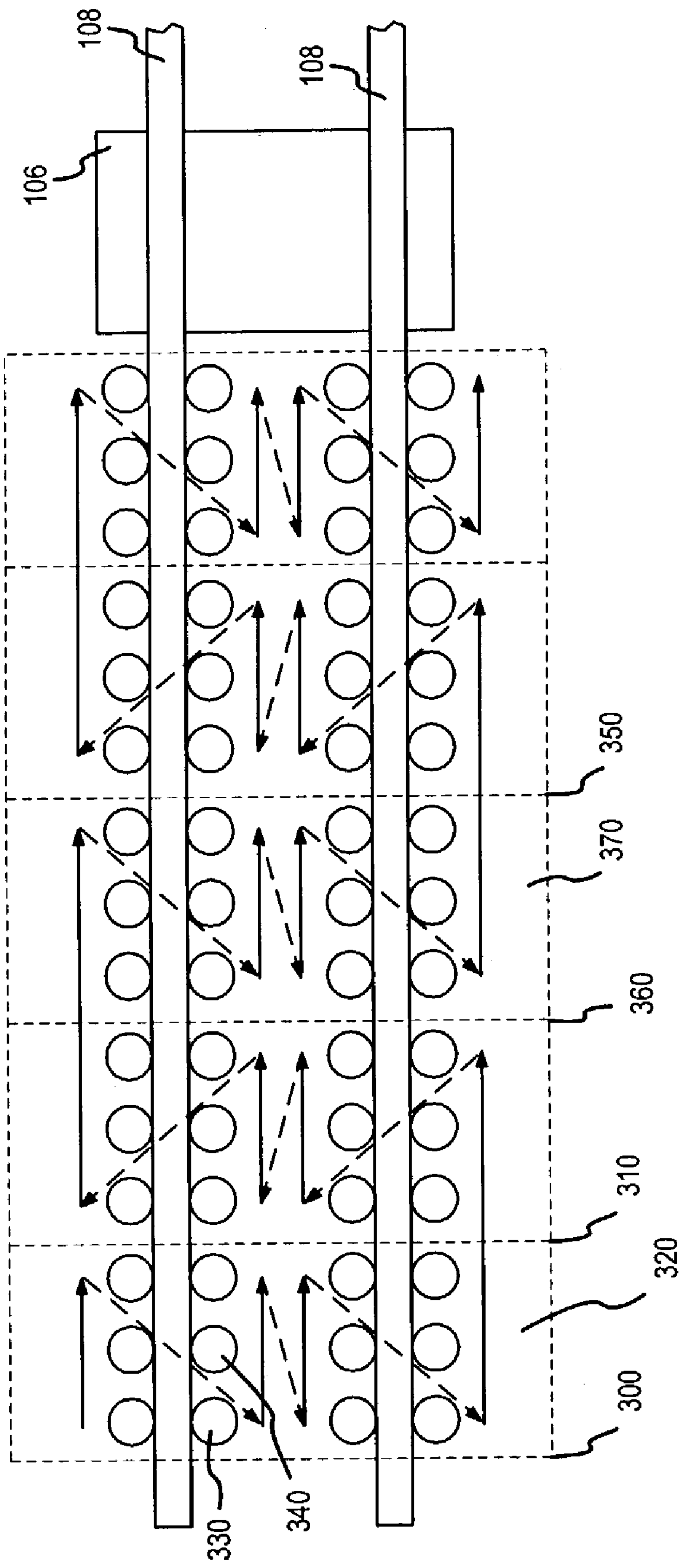
FIG. 3 is cross sectional view of a portion of a disc drive implementing a trapezoidal serpentine sequential write operation format with arrows indicating actuator movement and head switches in accordance with the present invention.

The trapezoidal serpentine pattern is illustrated in FIG. 3. The solid arrows indicate the direction of actuator movement during a single track seek operation from a first boundary (such as 300) toward a second boundary (such as 310) of a region (such as 320). As described above, an actuator seek is performed after a track (such as 330) is filled. The transducer then follows the adjacent track (such as 340) and executes a write operation until the track is full. The dashed arrows indicate the simultaneous operations of a head switch and actuator movement from a track adjacent to a second boundary (such as 350) to a track adjacent a first boundary (such as 360) of a region (such as 370).

The discs 108 are partitioned into a predetermined number of regions during the manufacturing test process of the disc drive. The optimal region size is determined such that the region is small enough to limit actuator seek time but large enough to minimize the number of head switches. Each disc drive determines the optimal region size based on inherent characteristics such as the mechanics and the servo bandwidth of the disc drive.

Figure 4:
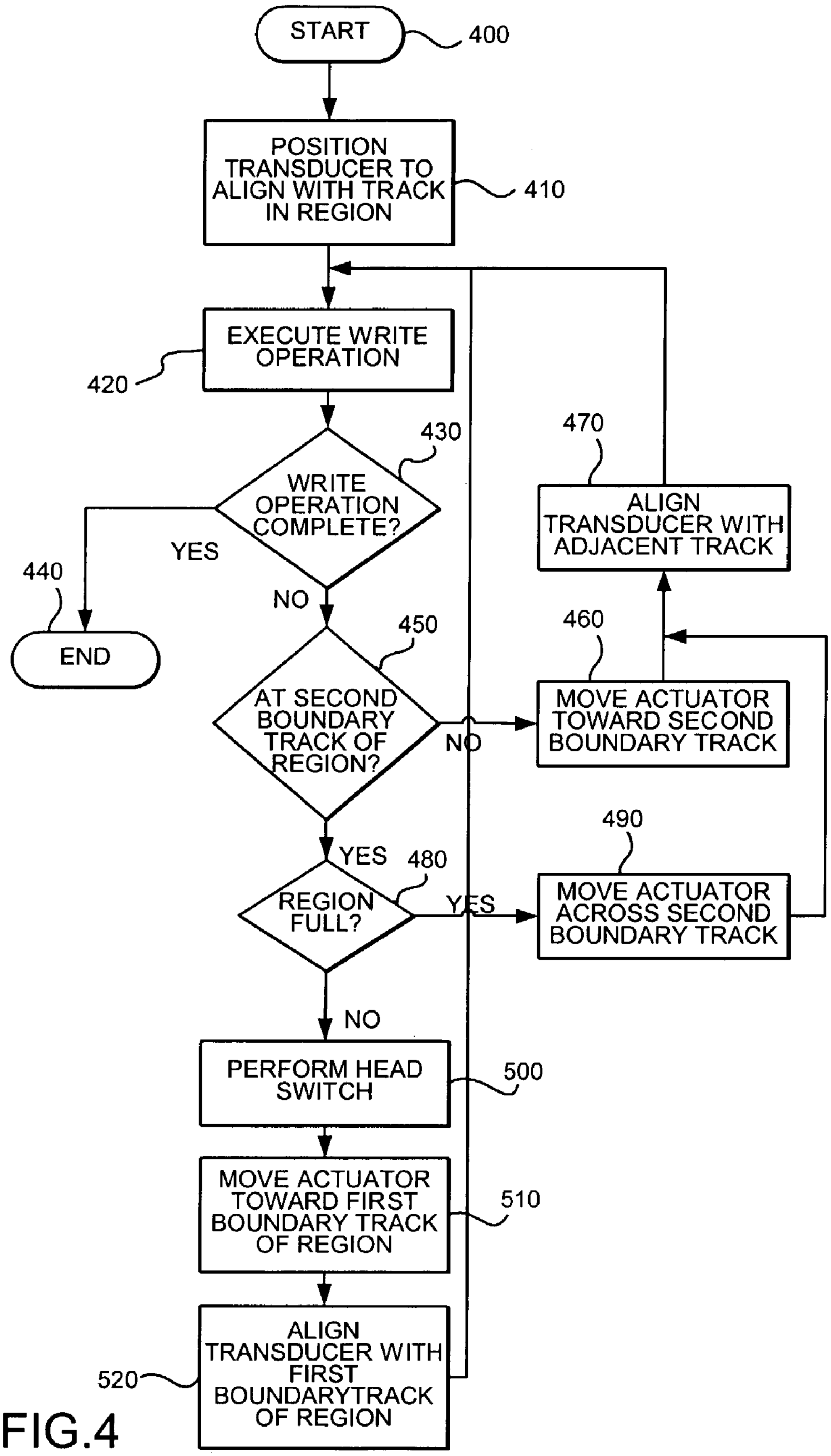
FIG. 4 is a flow chart of a method of arranging the lay out of written data on an information storage disc in accordance with the present invention.

An operational flow diagram of a method for writing data to a disc 108 by executing a trapezoidal serpentine pattern of actuator movement and head switches is illustrated in FIG. 4. The process begins at Operation 400. Process control is transferred to Operation 410. In Operation 410, the actuator 110 positions a transducer 202 over a track 210*a* in a region 226. The track 210*a* is adjacent to a first boundary 240 of the region 226 if the disc 108 is empty. Process control transfers to Operation 420. In Operation 420, the transducer 202 executes a write operation on the aligned track 210*a*. Process control transfers to Query Operation 430.

In Query Operation 430, completion of the write operation is determined. Process control transfers to Operation 440 if the write operation is complete. Process control transfers to Query Operation 450 if the write operation is not complete. If the write operation is complete, in Operation 440, the process ends. If the write operation is not complete, in Query Operation 450, a determination of track location is made. Process control transfers to Operation 460 if the track 210*a* is not adjacent to a second boundary 238 of the region 226. Process control transfers to Query Operation 480 if the track 210*a* is adjacent to the second boundary 238 of the region 226.

If the track 210*a* is not adjacent to a second boundary 238 of a region 226, in Operation 460, the actuator 236 moves toward the second boundary 238 of the region 226. Process control transfers to Operation 470. In Operation 470, the actuator 236 seeks an adjacent track 210*b*. Process control transfers to Operation 420.

If the track 210*b* is adjacent to the second boundary 238 of the region 226, in Query Operation 480, a determination is made about whether the region 226 is full, i.e., all the tracks in the region 226 have been written to. Process control transfers to Operation 490 if the region 226 is full. Process control transfers to Query Operation 500 if the region 226 is not full. If the region 226 is full, in Operation 490, the actuator 236 moves across the second boundary 238 of the region 226. Process control transfers to Operation 470.

If the region 226 is not full, in Operation 500, a head switch is performed. Process control transfers to Operation 510. In Operation 510, the actuator 236 moves in a direction toward the first boundary 240 of the region 226. Process control transfers to Operation 520. In Operation 520, the actuator 236 seeks a track 212*a* adjacent to the first boundary 240 of the region 226. Process control transfers to Operation 420.

A seek operation is executed after each head switch to align the transducer over the corresponding track adjacent to the first boundary of the region. Due to the fine track pitch on the disc surface, the seek time sensitivity is very small for relatively short seek operations, i.e., the time required to seek a short distance (e.g., 10 tracks) is essentially the same as the time required to seek a longer, but relatively short, distance (e.g., 30 tracks). In one embodiment of the invention, one region may include approximately 30 tracks. Thus, the process of performing a head switch while the actuator 236 moves from a track adjacent to a second boundary of a region to a track adjacent to a first boundary of a region, and executing a seek operation to align the transducer over the appropriate track is not less inefficient than a seek operation performed after a head switch as described in the prior art serpentine format.

The trapezoidal serpentine pattern of writing data to discs of the present invention results in a high sustained data rate because a seek operation is not required when the actuator 236 is traversing more than one region on the same disc surface. Different formats are not required for different transducer configurations, i.e., the invention operates in the same way for an odd or even number of disc surfaces. Furthermore, sequential disc addressing occurs in a single direction thereby eliminating reverse track movement on the disc surface.

In summary, an embodiment of the invention described herein may be viewed as a disc drive (such as 100) having one or more information storage discs (such as 108) rotatably mounted on a spin motor (such as 106). Each information storage disc is partitioned into a plurality of concentric regions (such as 226–234). Each region (such as 226) has tracks (such as 210*a*–210*c*) on each surface (such as 218) of each of the information storage discs (such as 108). The disc drive (such as 100) includes an actuator (such as 236) and an actuator control system (such as ?). The actuator (such as 236) is adjacent to the disc (such as 108) and carries a plurality of transducers (such as 202–208) for movement of each transducer (such as 202) over a different disc surface (such as 218). The actuator control system (such as ?) is programmed to write data to tracks (such as 210*a*–216*c*) on the disc surfaces (such as 218–224) within each region (such as 226) in a sequence from a track (such as 210*a*) adjacent a first region boundary (such as 240) in a first direction to a second region boundary (such as 238) until all tracks in a region (such as 226) are full. The actuator control system (such as ?) is further programmed to repeat the write sequence in each adjacent region (such as 228–234) until all the regions are full.

The actuator control system (such as ?) is programmed to write data to tracks in a direction toward an inner boundary (such as 3.50) of the region (such as 370). The actuator control system (such as ?) is further programmed to execute a head switch between adjacent surfaces (such as 220, 222) of the discs (such as 108). The actuator control system (such as ?) moves the actuator (such as 236) in a direction toward an outer boundary (such as 360) of the region (such as 370) during execution of the head switch. The actuator control system (such as ?) writes data to the disc (such as 108) in a trapezoidal serpentine pattern of actuator movement and head switches.

Another embodiment of the invention described herein is directed to a method of writing data to discs (such as 108) in a disc drive (such as 100). Concentric regions (such as 226, 228) are defined on data surfaces (such as 218, 220) of each disc (such as 108). The disc drive (such as 100) includes an actuator (such as 236) adjacent the disc (such as 108) carrying a plurality of transducers (such as 202–208) for movement of each transducer (such as 202) over a different disc surface (such as 218). The method may include the steps of: writing data to each track within a region on each disc surface sequentially from a first boundary track of the region in a first direction toward a second boundary track of the region (such as 420, 460); moving the actuator in a second direction from the second boundary track of the region to the first boundary track of the region during a head switch between adjacent surfaces of the discs (such as 500, 510); and continuing sequentially writing each track in the first direction across an adjacent region on a disc surface if there are no further adjacent disc surfaces (such as 420, 490).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the actuator can move from the second boundary of the region toward the first boundary of the region between transducer write operations on a disc surface, and the actuator can move from the first boundary of the region toward the second boundary of the region during a head switch. Numerous other changes may be made which will readily suggest themselves to those skilled in the art and which are encompassed in the spirit of the invention disclosed and as defined in the appended claims.

What is claimed is:

1. A data storage device comprising:

a first data storage surface rotatably mounted on a spindle, wherein the first data storage surface is partitioned into a first region and a second region, each region comprising data tracks;

a second data storage surface rotatably mounted on the spindle, wherein the second data storage surface is partitioned into a first region and a second region, each region comprising data tracks;

wherein the first regions on each surface are approximately an equal distance on their respective surfaces from the spindle;

wherein the second regions on each surface are approximately an equal distance on their respective surfaces from the spindle, the second regions being at a different distance than the first regions;

an actuator assembly adjacent the first data storage surface and the second data storage surface which carries a plurality of transducers for movement of each transducer over a different data storage surface; and a control system operably programmed to write data to the first and second surfaces using the transducers to:

map data to consecutive data tracks in the first region on the first surface in a first direction until an end of the first region on the first surface;

then map data to consecutive data tracks in the first region on the second surface in the first direction until an end of the first region on the second surface;

then map data to consecutive data tracks in the second region on the second surface in the first direction until an end of the second region on the second surface;

then map data to consecutive data tracks in the second region on the first surface in the first direction.

2. The data storage device of claim 1, wherein the first direction is toward a spindle mounted at the center of the data storage surfaces.

3. The data storage device of claim 1, wherein the control system is further programmed to move the actuator assembly in a second direction during execution of a transducer switch, the second direction being opposite the first direction.

4. The data storage device of claim 3, wherein the second direction is away from a spindle mounted at the center of the surfaces.

5. The data storage device of claim 1, wherein an optimal region size is determined by inherent characteristics of the data storage device.

6. A method of writing data to data storage surfaces in a data storage device wherein each data storage surface has concentric regions, the data storage device having an actuator adjacent the data storage surfaces carrying a plurality of transducers for movement of each transducer over a different surface, the method comprising:

mapping data to consecutive data tracks in a first region on a first surface in a first direction until an end of the first region on the first surface;

then mapping data to consecutive data tracks in a first region on a second surface in the first direction until an end of the first region on the second surface;

then mapping data to consecutive data tracks in a second region on the second surface in the first direction until an end of the second region on the second surface;

then mapping data to consecutive data tracks in a second region on the first surface in the first direction.

7. The method of claim 6, wherein the first direction is toward a spindle mounted at the center of the data storage surfaces.

* * * * *